United States Patent [19]

Nelson

[11] Patent Number: 4,666,562

[45] Date of Patent: May 19, 1987

[54] SOLVENT RECOVERY FROM SOLVENT PROCESS MATERIAL MIXTURES

[75] Inventor: Stephen R. Nelson, Edmond, Okla.

[73] Assignee: Kerr-McGee Refining Corporation, Oklahoma City, Okla.

[21] Appl. No.: 424,393

[22] Filed: Sep. 27, 1982

[51] Int. Cl.$^4$ .................. B01D 3/06; B01D 3/38; C10G 7/00

[52] U.S. Cl. .................... 203/93; 203/88; 203/97; 203/98; 203/DIG. 25; 208/349; 208/358; 208/361; 208/363; 208/367; 585/800

[58] Field of Search ............ 203/75, 76, 83, 84, 203/79, 78, 85, 88, 93, 92, 95–98, DIG. 25, 39; 208/8 R, 8 LE, 11 R, 11 LE, 309, 322, 324, 356, 357, 358, 367, 363, 361, 349; 196/114, 127; 585/800, 833, 868

[56] References Cited

U.S. PATENT DOCUMENTS

| | | | |
|---|---|---|---|
| 2,166,160 | 7/1939 | King | 208/313 |
| 2,196,878 | 4/1940 | Stover | 208/363 |
| 2,242,173 | 5/1941 | Buckley | 62/16 |
| 2,391,576 | 12/1945 | Katz et al. | 62/16 |
| 2,391,607 | 12/1945 | Whaley | 208/356 |
| 2,596,785 | 5/1952 | Nelly et al. | 208/341 |
| 2,678,907 | 5/1954 | Baldwin et al. | 203/96 |
| 2,940,920 | 6/1960 | Garwin | 208/45 |
| 3,565,787 | 2/1971 | Bauer | 203/95 |
| 3,607,716 | 9/1971 | Roach | 208/8 R |
| 3,607,717 | 9/1971 | Roach | 208/8 R |
| 3,763,016 | 10/1973 | Hair | 203/95 |
| 3,969,196 | 7/1976 | Zosel | 203/49 |
| 4,279,739 | 7/1981 | Roach | 208/363 |
| 4,315,815 | 2/1982 | Gearhart | 208/363 |
| 4,415,443 | 11/1983 | Murphy | 208/356 |

Primary Examiner—Wilbur Bascomb
Attorney, Agent, or Firm—William G. Addison

[57] ABSTRACT

A method of recovering light organic solvent from a liquid mixture containing the solvent and a process material, such as asphaltenes or coal liquefaction products. The solvent-process material mixture is treated in a solvent separation zone to separate a first vapor phase rich in solvent and a first liquid phase rich in process material. At least a portion of the liquid in the solvent separation zone is transferred to a mixing zone, where the liquid is intimately contacted with steam, under shearing conditions. The steam-liquid phase mixture thus produced is returned to the solvent separation zone and treated to separate a second vapor phase, rich in steam and solvent, and a second liquid phase, rich in process material and substantially depleted of solvent. Solvent is recovered from the first and second vapor phases.

18 Claims, 1 Drawing Figure

SOLVENT RECOVERY FROM SOLVENT PROCESS MATERIAL MIXTURES

FIELD OF THE INVENTION

The present invention relates to methods of recovering light organic solvents from liquid mixtures, and more particularly to such methods in which the liquid mixture contains a process material of high molecular weight, such as asphaltenes or coal liquefaction products.

SUMMARY OF THE INVENTION

The present invention comprises a method of recovering light organic solvent from a liquid mixture containing the solvent and a process material, such as asphaltenes or coal liquefaction products. The solvent-process material mixture is treated in a solvent separation zone to separate a first vapor phase rich in solvent and a first liquid phase rich in process material. At least a portion of the liquid in the solvent separation zone is transferred to a mixing zone, where the liquid is intimately contacted with steam, under shearing conditions. The steam-liquid phase mixture thus produced is returned to the solvent separation zone and treated to separate a second vapor phase, rich in steam and solvent, and second liquid phase, rich in process material and substantially depleted of solvent. Solvent is recovered from the first and second vapor phases.

DETAILED DESCRIPTION OF THE PREFERRED EMBODIMENT

Figure 1:
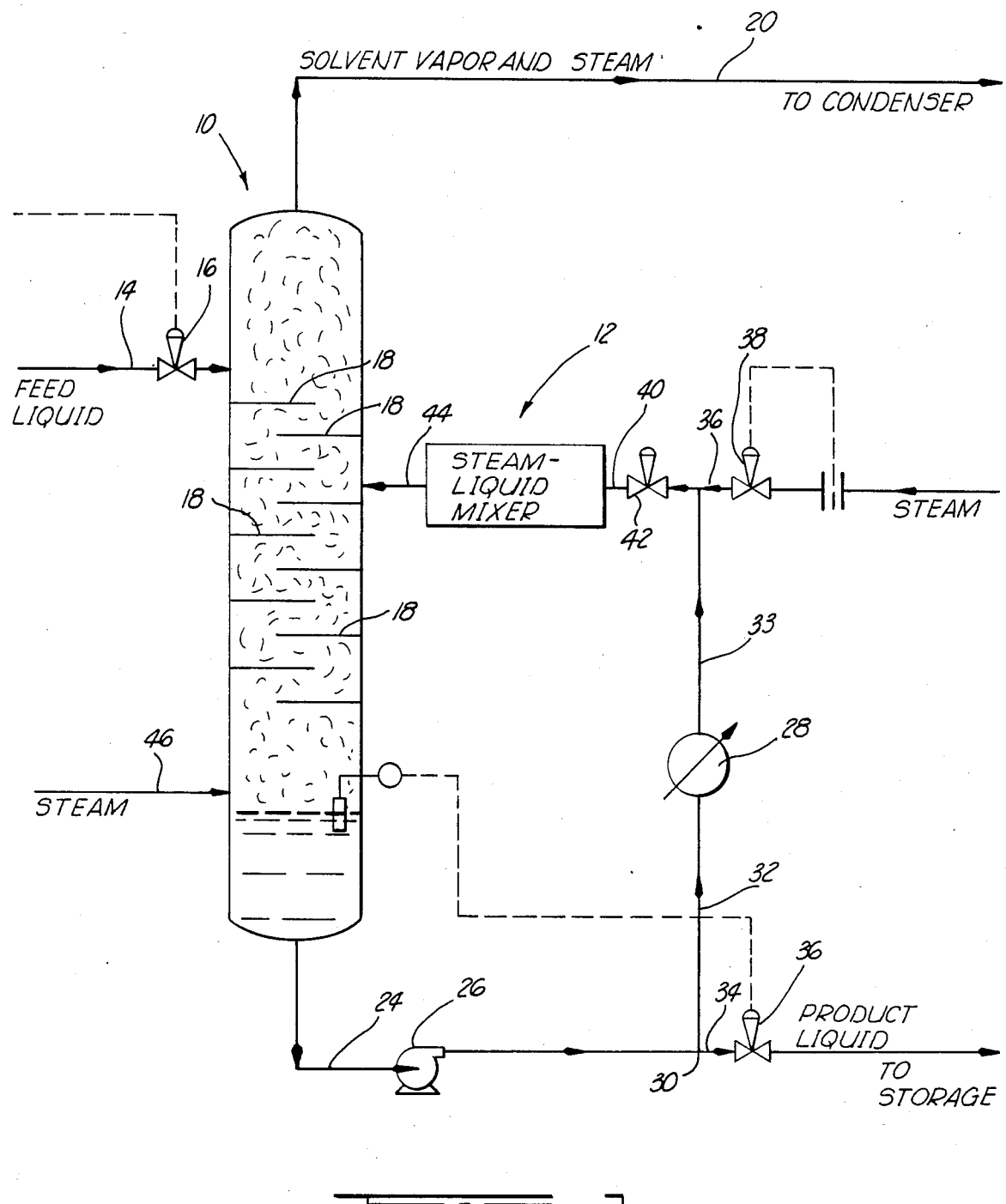
FIG. 1 shows the flow of materials in the method of the present invention.

The method of the present invention relates to the recovery of a light organic solvent from a liquid mixture of solvent and a process material. The method is believed to offer particular advantages in the separation of solvent from the liquid products of solvent extraction processes. Such processes have found application in the separation of asphalt-type bituminous materials, as described in U.S. Pat. No. 2,940,920, and in the separation of liquefied coal products, as described in U.S. Pat. No. 3,607,717. Such processes generally result in production of a liquid mixture containing a high molecular weight process material and a light organic solvent, at a pressure near or above the critical pressure of the solvent, and possibly at a temperature near or above the critical temperature of the solvent.

As described in greater detail in U.S. Pat. No. 2,940,920, the solvent used in separation of asphalt-type bituminous material is preferably a paraffinic hydrocarbon having between about 3 and about 8 carbon atoms, such as pentane; in this separation process a liquid mixture is produced which contains this solvent and an asphaltene process material. As described in greater detail in U.S. Pat. No. 3,607,717, the solvent used in separation of liquefied coal products is preferably an aromatic cyclic compound having between about 5 and about 9 carbon atoms, such as pyridine, benzene, toluene, or xylene; in this separation process, a liquid mixture is produced which contains this solvent and coal liquefaction products.

In solvent extraction processes used for both liquefied coal and for asphalt-type bituminous materials, it is desirable to effect the maximum feasible separation of solvent from process material. Particularly in solvent refined coal processes, the solvent may be expensive; recovery of solvent from the process material is necessary if the process is to be economically efficient. Furthermore, traces of the unremoved solvent in the process material may flash at such low temperatures as to make the process material unsuitable for some applications. Recovery of the solvent is necessary if the process material is to be available for a broad range of end uses.

With high molecular weight process materials, such as asphaltenes and coal liquefaction products, the solvent-process material mixture is generally a highly viscous mixture at lower temperatures. The high viscosity renders it difficult to effectively strip the solvent from the solvent-process material mixture using conventional steam stripping techniques. While the viscosity of the mixture can be reduced to some extent by raising the temperature of the mixture, the temperature cannot be raised any higher than that at which the process material begins to thermally decompose, by polymerization, cracking or other chemical reactions. In general, these process materials begin thermal decomposition at temperatures substantially below their boiling points. Even near the temperature at which the process material begins to undergo thermal decomposition, the mixture may remain so viscous as to prevent complete separation of solvent by conventional steam stripping techniques.

The method of the present invention effects the recovery of light organic solvents from a liquid mixture containing the solvent and a process material, which may comprise a high molecular weight substance such as asphaltenes or coal liquefaction products. With reference to FIG. 1, feed liquid, comprising the solvent-process material mixture, is received in a solvent separation zone 10. In the solvent separation zone 10, a first vapor phase rich in solvent is separated from a first liquid phase rich in process material. The first vapor phase is released from the first solvent separation zone 10 and transferred to a condenser (not shown), where solvent is recovered.

At least a portion of the first liquid phase is transferred to a mixing zone 12, where the liquid is intimately contacted with steam, under shearing conditions, to produce a steam-liquid phase mixture. This steam-liquid phase mixture is returned to the solvent separation zone 10, where a second vapor phase, rich in steam and solvent vapor, is separated from a second liquid phase, which is rich in process material. The second vapor phase is released from the solvent separation zone 10, and is transferred to a condenser (not shown), where solvent is recovered. The first and second liquid phases, now having substantially reduced solvent content, are withdrawn from the solvent separation zone 10. Given this overview of the method of the present invention, a more detailed description will now be provided.

With continued reference to FIG. 1, feed liquid, comprising solvent-process material mixture, is received in the solvent separation zone 10 through a conduit 14; flow of the mixture in the conduit 14 is controlled by a valve 16. Feed liquid is received in the conduit 14 from a source vessel (not shown); in the event that the method of the present invention is used in conjunction with a solvent extraction process, then the source vessel will ordinarily comprise a settling vessel, which is maintained at a pressure near or above the critical pressure of the solvent, and which may also be maintained at a temperature near or above the critical temperature of the solvent.

As indicated by the dashed line in FIG. 1, the valve 16 is preferably a level control valve responsive to the liquid level in the source vessel. As the liquid level rises in the source vessel, the valve 16 is opened to permit feed liquid to flow through the conduit 14 into the solvent separation zone 10; as the liquid level falls in the source vessel, flow of feed liquid into the solvent separation zone 10 is stopped by closure of the valve 16.

The solvent separation zone 10 preferably comprises a closed equilibrium vessel which is maintained at a pressure substantially below that of the source vessel, and below the vapor pressure of the solvent at the temperature of the solvent separation zone 10. The solvent-process material mixture received in the solvent separation zone 10 thus undergoes a reduction of pressure, which causes the solvent-process material mixture to flash or separate into a first vapor phase, rich in solvent vapors, and a first liquid phase, rich in process material but also containing residual quantities of solvent. The solvent-process material mixture remains in the solvent separation zone 10 for a residence time sufficient to permit this separation to take place.

The solvent-process material mixture is preferably introduced into the upper portion of the solvent separation zone 10; after it is introduced into solvent separation zone 10, the solvent-process material mixture may flow over one or more side-by-side pans 18. Other types of contact devices, such as shed decks, sieve trays or bubble trays, could be employed in lieu of the pans shown in FIG. 1. These contact devices function to increase the surface area of the solvent-process material mixture as it flows downwardly into the solvent separation zone 10, and thus function to promote separation of the first vapor phase from the first liquid phase.

After the solvent-process material mixture has been separated, the first liquid phase is collected in the lower portion of the solvent separation zone 10, while the first vapor phase accumulates in the upper portion of the solvent separation zone 10. Vapor from the solvent separation zone 10, comprising the first vapor phase commingled with steam and vapor of the second phase, to be described hereafter, is withdrawn from the top of the solvent separation zone 10 through a conduit 20. Vapor flows through the conduit 20 to a condenser (not shown), where liquid solvent is recovered and subsequently recycled.

Liquid, comprising the first liquid phase commingled with the second liquid phase, to be described hereafter, is withdrawn from the lower portion of the solvent separation zone 10 into a conduit 24. A pump 26 is installed in the conduit 24 in order to effect the transfer of the first liquid phase from the solvent separation zone 10. Such a pump will preferably be located between the solvent separation zone 10 and the heat exchanger 28, to be described hereafter. The pump 26 is preferably operated continuously during practice of the method of the present invention.

Liquid in the conduit 24 flows to a T-junction 30, which opens into a first recycle conduit 32 and a rundown conduit 34. At least a portion of the liquid withdrawn from the solvent separation zone 10 flows into the first recycle conduit 32; the remainder of the liquid flows into the rundown conduit 34, which communicates with a storage zone (not shown). The flow of liquid in the rundown conduit 34 is controlled by a valve 36, which preferably comprises a level control valve responsive to the liquid level in the solvent separation zone 10. Thus, an increase in the level of liquid in the solvent separation zone 10 causes the valve 36 to open, thus allowing a portion of the liquid to flow into the rundown conduit 34. A decrease of liquid level in the solvent separation zone 10 correspondingly causes the valve 36 to close. When the valve 36 is closed, the liquid withdrawn from the solvent separation zone by the pump 26 is routed into the first recycle conduit 32.

Liquid received in the first recycle conduit 32 flows through the heat exchanger 28, which maintains the liquid in the lower portion of the solvent separation zone 10, and thus the liquid in the conduits 24, 32, 34, 40 and 44, at a temperature permitting the liquid to remain flowable. The heat exchanger 28 operates to heat the liquid, and thus to decrease the viscosity of the liquid prior to its introduction in the mixing zone 12. This reduction in viscosity renders the liquid more flowable, and thus increases the speed and efficiency with which the method of the present invention may be carried out. Furthermore, the reduction in viscosity permits more complete mixing of the liquid with steam during the mixing step, to be described hereafter, and thus enhances the degree of solvent recovery offered by the method of the present invention.

The heat exchanger 28 preferably raises the temperature of the liquid to a temperature near, but not in excess of, the temperature at which the process material begins to undergo excessive thermal decomposition. When the process material comprises asphaltenes or coal liquefaction products, the heat exchanger 28 preferably provides sufficient heat that the liquid in the lower portion of the solvent separation zone 10 is at a temperature between about 500° F. and about 550° F. Higher liquid temperatures may be employed in the conduits 33, 40 and 44 (to be described hereafter) if the liquid is retained in these conduits for residence times shorter than the liquid residence time in the solvent separation zone 10. Liquid leaving the heat exchanger 28 flows into the second recycle conduit 33.

It should be understood that heat exchanger 28 is not necessarily required for practice of the present invention. In the event that the solvent separation zone 10 is maintained at a temperature sufficiently high to impart the described viscosity characteristics to the liquid, then the heat exchanger 28 may be dispensed with.

With continued reference to FIG. 1, a stripping gas, such as steam, flows through a conduit 36. Although light hydrocarbons, such as methane or natural gas, may be suitable stripping gases in some applications of the present invention, steam is regarded as the preferable stripping gas. Thus, the following description will make reference to steam as the stripping gas; however, it should be understood that other stripping gases may be employed in like manner.

The steam flowing in the conduit 36 is substantially dry—that is, substantially free of entrained liquid water droplets. This drying is preferably accomplished by superheating the steam. The rate of flow of steam in the conduit 36 is controlled by a rate control valve 38.

The steam in the conduit 36 and the liquid in the second recycle conduit 33 are combined in a header (not shown), and flow concurrently through a conduit 40 into the mixing zone 12. A back pressure control valve 42 is provided in the conduit 40; alternately, the valve 42 may be placed in the second recycle conduit 33. The valve 42 maintains sufficient back pressure at the junction 30 to permit the flow of product liquid to the storage zone. The pressure maintained by the valve 42 also contributes to minimizing flashing of solvent in the heat exchanger 28 and in the recycle conduits 32 and 33.

The mixing zone 12 preferably comprises either a static or a dynamic (mechanical) mixing device. In the mixing zone 12, the steam and the liquid are intimately contacted, under shearing conditions. When the liquid and steam comprise a thixotropic mixture, this combination of mixing and shearing effects a reduction in the viscosity of the liquid, and thus promotes transfer of the residual solvent to the surface of the liquid, as required for removal of the solvent by the steam.

The mixing step just described produces a steam-liquid phase mixture which flows through the conduit 44 to the solvent separation zone 10, and preferably into the upper portion thereof. In the solvent separation zone 10, the steam-liquid phase mixture flows over the pans 18, and is retained for a residence time sufficient to permit separation of the mixture into a second vapor phase, rich in steam and solvent vapor, and a steam-stripped second liquid phase, rich in process material and substantially depleted of unwanted solvent components. The second vapor phase accumulates in the upper portion of the solvent separation zone 10, while the second liquid phase accumulates in the lower portion of the solvent separation zone 10.

The steam and the second vapor phase are commingled with the first vapor phase. As previously described, the vapor phases and the steam are withdrawn from the top of the solvent separation zone 10 and flow through the conduit 20 to the condenser, where liquid solvent is recovered and thereafter recycled.

The second liquid phase is commingled with the first liquid phase in the lower portion of the solvent separation zone 10. As described previously, the commingled liquid phases are withdrawn from the solvent separation zone 10 and into the conduit 24. At the junction 30, at least a portion of this liquid flows into the first recycle conduit 32, while the remainder flows in the rundown conduit 34 to the storage zone (not shown).

Steam may be introduced into the solvent separation zone 10 through a steam conduit 46, which preferably communicates with the lower portion of the solvent separation zone 10 at a point above the liquid-vapor interface. Steam received through the steam conduit 46 flows in countercurrent relationship to the solvent-process material and steam-liquid phase mixtures introduced into the solvent separation zone 10. This steam promotes further separation of solvent from process material and augments the separating action provided in other steps of the present invention. The steam also assists in minimizing reabsorption by the liquid phase of solvent vapors separated in accordance with the present invention. The steam introduced into the solvent separation zone 10 via steam conduit 46 leaves the solvent separation zone 10 through the conduit 20.

From the foregoing description, it will be appreciated that the method of the present invention provides an efficient and economical method of recovering light organic solvents from liquid mixtures of solvent and process material. The method offers particular advantages with high viscosity process material from which solvent is not easily recovered. The method thus offers enhanced economy by permitting the recovery and recycling of greater quantities of solvent, and further offers a more desirable process material, containing little of the unrecovered solvent which has heretofore been a disadvantage in some end use activities.

Changes may be made in the construction, operation and arrangement of the various parts, elements, steps and procedures described herein without departing from the spirit and scope of the invention as defined in the following claims.

What is claimed is:

1. A method of recovering light organic solvent and a process material, comprising:
   treating the solvent-process material mixture in a solvent separation zone to separate a vapor phase rich in solvent and a liquid phase rich in process material;
   transferring at least a portion of the liquid in the solvent separation zone to a mixing zone;
   intimately contacting liquid in the mixing zone the steam, under shearing conditions, to produce a steam-liquid phase mixture;
   treating the steam-liquid phase mixture in the solvent separation zone to separate a vapor phase rich in solvent and steam, and a liquid phase, rich in process material; and
   recovering solvent from the vapor phase.

2. The method of claim 1, further comprising:
   maintaining the liquid in the solvent separation zone at a temperature permitting the liquid to remain flowable, said temperature being below that at which the process material begins thermal decomposition.

3. The method of claim 1, further comprising:
   decreasing the viscosity of the liquid transferred to the mixing zone prior to introducing the liquid into the mixing zone, by heating the liquid.

4. The method of claim 1 in which each treatment step in the solvent separation zone is carried out by reducing pressure on mixture introduced in the solvent separation zone.

5. The method of claim 4, further comprising:
   decreasing the viscosity of the liquid transferred to the mixing zone, prior to introducing the liquid into the mixing zone, by heating the liquid.

6. The method of claim 1 in which the steam and the liquid flow concurrently into the mixing zone.

7. The method of claim 1 in which the steam introduced into the mixing zone is dry.

8. The method of claim 1, further comprising:
   withdrawing from the solvent separation zone that portion of the liquid not transferred to the mixing zone.

9. The method of claim 8 in which each treatment step in the solvent separation zone is carried out by reducing pressure on the mixture introduced therein.

10. The method of claim 1 in which the process material is characterized as undergoing thermal decomposition at a temperature substantially below its boiling point.

11. The method of claim 1 in which the process material comprises asphaltenes.

12. The method of claim 11 in which the solvent comprises a paraffinic hydrocarbon having between about 3 and about 8 carbon atoms.

13. The method of claim 1 in which the process material comprises coal liquefaction products.

14. The method of claim 13 in which the solvent comprises an aromatic cyclic compound having between about 5 and about 9 carbon atoms.

15. The method of claim 1 in which the solvent separation zone comprises an enclosed vessel, and in which the steam-liquid phase mixture is introduced into the upper portion of the vessel.

16. The method of claim 1 in which the solvent separation zone comprises an enclosed vessel.

17. The method of claim 1, further comprising: introducing steam into the solvent separation zone during the treatment steps.

18. The method of claim 17 in which the solvent separation zone comprises an enclosed vessel and in which steam is introduced into the lower portion of the vessel.

* * * * *